2,898,369
Patented Aug. 4, 1959

2,898,369

N,N,N',N" TETRAETHYL GUANIDINE AND ITS ACID ADDITION SALTS

Cornelius K. Cain, Flourtown, Pa., assignor to McNeil Laboratories, Incorporated, Philadelphia, Pa., a corporation of Pennsylvania No Drawing. Application February 23, 1956
Serial No. 567,085

7 Claims. (Cl. 260—501)

The present invention relates to novel chemical compounds; and, more particularly, it relates to a novel derivative of guanidine and its salts possessing valuable therapeutic properties. More specifically, the invention relates to a novel guanidine derivative and its salts, and to pharmaceutical compositions comprising them, which are orally- as well as parenterally-active, well-tolerated, potent diuretics. The invention also relates to a method of effecting diuresis, and to a method for making the compounds.

The primary use of diuretics is in the therapy of congestive heart failure and other chronic edematous conditions. Digitalis is normally the first drug considered in the treatment of congestive heart failure, but, as is well known, is inadequate in such treatment by itself and a diuretic must be used to assist in the treatment. The best known and most commonly used diuretics are organic compounds containing mercury. These compounds must be given parenterally, since when given orally they produce gastric distress and inadequate diuresis. Until the present invention there have been no compounds available that have been adequately orally active when given in doses that are tolerated by the patient or that can be given repeatedly (Goodman and Gilman, The Pharmacological Basis of Therapeutics, second edition, The MacMillan Co., N.Y., 1955, page 849).

It is the principal object of the present invention to provide novel chemical compounds possessing valuable pharmaceutical properties.

It is another object of the present invention to provide novel chemical compounds and pharmaceutical compositions containing them which possess valuable diuretic properties, are active as diuretics orally as well as parenterally and are well tolerated.

Other objects, including the provision of a novel method for preparing the novel compounds and the provision of a novel method for effecting diuresis, will become apparent from a consideration of the following sepcification and the claims.

The compounds of the present invention are guanidine derivatives selected from the group consisting of N,N,N',N"-tetraethylguanidine and its non-toxic acid addition salts.

These compounds have been found to be potent diuretics which are active orally as well as parenterally. In addition, the compounds are well tolerated, that is to say, can be given repeatedly over long periods of time without either diminishing or increasing in activity. The compounds, at doses providing substantial diuresis, are non-toxic and produce no apparent undesirable side effects. Such compounds are particularly useful in the therapy of individuals having congestive heart failure and other chronic edematous conditions. The activity of the compounds is surprising in view of the fact that the most closely related derivatives, including homologs and isomers thereof, do not possess the stated properties. For example, N,N,N',N'-tetraethylguanidine, an isomer of the N,N,N',N"-tetraethylguanidine of the present invention, and N,N,N',N"-tetramethylguanidine, not only do not produce diuresis, but in addition produce undesirable side effects including lowering of blood pressure, tremor and difficulty in breathing.

The compound N,N,N',N"-tetraethylguanidine possesses basic properties enabling it to form addition salts with acids. Hence the compound may be prepared and/or employed either as the base or as such salt. The acid forming the salt may be any inorganic or organic acid desired, for example, hydrochloric, hydrobromic, hydriodic, nitric, sulfuric, phosphoric, and the like; acetic, propionic, caproic, stearic, and other acids of this series, and the like; crotonic, fumaric, oleic, citric, tartaric, lactic, maleic, benzoic, naphthoic, salicylic, methane sulfonic, camphor sulfonic, and the like. The normal salts as well as the acid salts may be employed. The preferred salts are the fumarate, hydrogen fumarate, maleate, sulfate and hydrochloride.

If a salt is to be administered, the salt will be pharmaceutically acceptable and any toxicity or other undesirable effects which may be imparted by the salt-forming acid should be taken into consideration as well known in the art. Pharmaceutically useful salts should not be substantially more toxic than the base compound itself and should be able to be incorporated in liquid or solid pharmaceutical media for the preparation of therapeutically useful compositions. The salts for administration will be "non-toxic" as that term is understood in the art to refer to salts which, upon administration at levels sufficient to produce the desired effect, i.e. diuresis, do not produce any substantial deleterious side effects.

The N,N,N',N"-tetraethylguanidine may be readily prepared by reacting one mole of 1,3-diethylthiourea with one mole of diethylamine. The reaction preferably takes place in solution in a solvent for the reactants. Examples of solvents that may be used are water; the alcohols, such as methanol, ethanol, isopropanol, and the like; ketones, such as acetone, and methyl ethyl ketone; and the like.

The temperature of the reaction mixture may vary widely, from room temperature up to the boiling point of the solvent.

Since hydrogen sulfide is liberated during the reaction, there is preferably included in the reaction medium a compound of a metal which will precipitate as a metallic sulfide, that is to say, a metal compound which will react with the hydrogen sulfide to form a metal sulfide insoluble in the reaction medium. Such metal compounds are, for example, mercury salts, such as mercuric chloride; iron salts, such as a ferric chloride; copper salts, such as cupric acetate; lead compounds, such as lead oxide (PbO); and the like.

Upon completion of the reaction, the compound can be isolated and purified following conventional techniques. When a metal compound is included in the reaction medium, the resulting insoluble metal sulfide may be initially removed as by filtration. Any excess metal compound remaining in solution may be removed by treating the solution with hydrogen sulfide to precipitate the remaining metal. The solvent and any excess reactant may be removed as by distillation, the desired N,N,N',N"-tetraethylguanidine being the residue.

As stated, the compounds of the invention may be administered orally as well as parenterally. In administering the compounds orally, the compound is normally mixed with a suitable liquid or solid pharmaceutical carrier to provide a solution, suspension, capsule or tablet. Suitable pharmaceutical carriers in this connection are water, oils, alcohols, glycols, or the like, in the case of a solution or suspension, or gelatin, starch, sugars, inorganic salts, lubricants, or the like, in the case of a tablet or capsule. Tablets are the preferred form for oral administration. For parenteral administration the compound will be mixed with one of the stated liquid vehicles.

The amount of N,N,N',N''-tetraethylguanidine compound administered may vary widely from as little as about 0.1 to as high as about 100 milligrams per kilogram of body weight depending upon the species being treated and its size and age; it having also been found that even excessive amounts from the standpoint of effective diuresis are harmless. Hence, the concentration of compound in any composition may also vary widely. Generally, the N,N,N',N''-tetraethylguanidine compound in any pharmaceutical composition will be in a concentration of at least about 0.1%, by weight. The concentration of the compound may go well above this figure, and in some compositions, particularly tablets, the concentration may reach as high as about 90%, by weight. As stated, tablets are a preferred means of oral administration for the compounds of the present invention, and in tablets the concentration of active compound is preferably at least about 10%, by weight. In solutions for parenteral administration, the concentration of N,N,N',N''-tetraethylguanidine compound is generally between about 0.1% and about 50%, by weight.

For oral or parenteral administration, the compositions are generally preferably prepared in dosage unit form, and such compositions will contain, per dosage unit, between about 10 milligrams and about 10 grams of the N,N,N',N''-tetraethylguanidine compound.

The present invention will be more readily understood from a consideration of the following specific examples which are given for the purpose of illustration only and are not intended to limit the scope of the invention in any way.

*Example I*

A mixture of 13.2 grams (0.1 mole) of 1,3-diethylthiourea, 27.1 grams (0.1 mole) of mercuric chloride, 14 grams (0.2 mole) of diethylamine and 100 ml. of methanol is allowed to stand at room temperature for 18 hours. The mixture is then filtered to remove mercuric sulfide, and the filtrate is treated with hydrogen sulfide to precipitate the remaining unreacted mercury in solution. This precipitated mercuric sulfide is also removed by filtration. The methanol and excess diethylamine are removed by distillation. The residue is dissolved in water and the resulting solution is made strongly basic with potassium hydroxide, and extracted with ether. The ether extract is then evaporated, and the residue remaining is distilled at 55–60° C. at 0.3–0.6 mm. of mercury to provide N,N,N',N''-tetraethylguanidine as an oil which solidifies on cooling and which remelts when warmed to approximately 40° C.

*Example II*

A 96 gram (0.56 mole) sample of N,N,N',N''-tetraethylguanidine is dissolved in 200 ml. of methanol and to the clear solution are added 65 grams (0.56 mole) of fumaric acid. The salt is precipitated by the addition of ether. After recrystallization from isopropyl alcohol and from a mixture of methanol and ether, the salt, N,N,N',N'' - tetraethylguanidine hydrogen fumarate, weighs 134 grams (84% yield) and has a melting point of 172–173° C.

The calculated analysis for $C_9H_{21}N_3 \cdot C_4H_4O_4$ is: C, 54.3; H, 8.8; and N, 14.6; that found is: C, 54.2; H, 8.9; and N, 14.6.

The following are examples of compositions containing this salt which have been and may be administered orally: a 0.2%, by weight, solution in distilled water; a 2%, by weight, solution in a mixture of 8.6% polythylene glycol 300, 0.5% sodium carboxymethylcellulose and the remainder water; gelatin capsules containing 660 milligrams of the salt per capsule and gelatin capsules containing 700 milligrams of the salt per capsule.

*Example III*

The procedure of Example II is followed using, however, one-half the amount of fumaric acid to provide the normal fumarate. The compound has a melting point of 173–174° C.

The calculated nitrogen analysis for $$(C_9H_{21}N_3)_2 \cdot C_4H_4O_4$$

is: N, 18.34; that found is N, 18.8.

Modification is possible in the selection of the particular form of the guanidine compound, as well as in the amount of the compound and the nature of the carriers and vehicles employed in preparing pharmaceutical compositions without departing from the scope of the invention.

I claim:
1. Guanidine derivatives selected from the group consisting of N,N,N',N''-tetraethylguanidine and its pharmaceutically acceptable acid addition salts.
2. N,N,N',N''-tetraethylguanidine.
3. A N,N,N',N''-tetraethylguanidine fumarate.
4. N,N,N',N''-tetraethylguanidine hydrogen fumarate.
5. N,N,N',N''-tetraethylguanidine maleate.
6. N,N,N',N''-tetraethylguanidine sulfate.
7. N,N,N',N''-tetraethylguanidine hydrochloride.

References Cited in the file of this patent
UNITED STATES PATENTS

| | | |
|---|---|---|
| 1,723,696 | Hahl | Aug. 6, 1929 |
| 1,795,738 | Schotte | Mar. 10, 1931 |
| 1,805,889 | Schoeller | May 19, 1931 |
| 2,729,586 | Peck | Jan. 3, 1956 |
| 2,762,745 | Benend | Sept. 11, 1956 |

OTHER REFERENCES

Schotte: Chem. Abs., vol. 22, p. 1760 (1928).
Beilstein: vols. 3–4, p. 338, 4th ed. (1929).
Taylor et al.: Sidgwick's Org. Chem. of Nitrogen, pp. 297–8 (1949).